US007574884B2

(12) United States Patent  
Carsley et al.

(10) Patent No.: US 7,574,884 B2  
(45) Date of Patent: Aug. 18, 2009

(54) APPARATUS AND METHOD FOR SHEET MATERIAL FORMING

(75) Inventors: John E. Carsley, Clinton Township, MI (US); George L. Kilbertus, Gladwin, MI (US); Gerald Edward Sokol, Shelby Township, Macomb County, MI (US); Gary A. Kruger, Troy, MI (US); Paul E. Krajewski, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 687 days.

(21) Appl. No.: 11/232,707

(22) Filed: Sep. 22, 2005

(65) Prior Publication Data

US 2007/0063385 A1  Mar. 22, 2007

(51) Int. Cl.  
*B21D 22/20* (2006.01)  
*B21D 31/00* (2006.01)  
*B21D 37/16* (2006.01)

(52) U.S. Cl. ............... 72/57; 72/60; 72/342.8; 72/342.92; 72/342.94; 72/342.96; 29/421.1

(58) Field of Classification Search ............. 72/56, 72/57, 58, 59, 60, 61, 62, 63, 342.1, 342.7, 72/342.8, 342.92, 342.94, 342.96; 29/421.1  
See application file for complete search history.

(56) References Cited

U.S. PATENT DOCUMENTS

| | | | | |
|---|---|---|---|---|
| 4,437,326 A | * | 3/1984 | Carlson | 72/62 |
| 4,474,044 A | * | 10/1984 | Leistner et al. | 72/60 |
| 4,584,860 A | * | 4/1986 | Leonard | 72/61 |
| 5,214,949 A | * | 6/1993 | Cadwell | 72/60 |
| 5,728,309 A | * | 3/1998 | Matsen et al. | 72/60 |
| 5,992,197 A | * | 11/1999 | Freeman et al. | 72/62 |
| 6,050,121 A | | 4/2000 | Daehn et al. | 72/57 |
| 6,085,562 A | | 7/2000 | Daehn et al. | 72/57 |
| 6,564,605 B1 | * | 5/2003 | Gafri et al. | 72/56 |
| 6,613,164 B2 | | 9/2003 | Dykstra et al. | 148/520 |
| 7,204,119 B2 | * | 4/2007 | Kruger et al. | 72/342.7 |
| 7,231,793 B2 | * | 6/2007 | Sohn et al. | 72/61 |
| 7,305,860 B2 | * | 12/2007 | Yang et al. | 72/61 |

* cited by examiner

*Primary Examiner*—David B Jones  
(74) *Attorney, Agent, or Firm*—Quinn Law Group, PLLC

(57) ABSTRACT

The present invention relates to a heating and forming apparatus for sheet material and method for rapid heating and shaping of sheet material. The apparatus comprises a first and second respectively movable forming dies, with the first forming die having a forming surface and defining a cavity with the second forming die. The apparatus is adaptable to receive a sheet material positionable within the cavity. A heating mechanism is placed within the cavity to heat the sheet material. The forming surface of the first forming die is not substantially heated. A pressurization mechanism is in communication with the cavity to move the sheet material into conformity with the forming surface of the first die. An improvement in the process of stretch forming a sheet material into a product by using quick plastic forming (QPF) or superplastic forming (SPF) is provided.

12 Claims, 3 Drawing Sheets

US 7,574,884 B2

APPARATUS AND METHOD FOR SHEET MATERIAL FORMING

TECHNICAL FIELD

The invention relates to a heating and forming apparatus for sheet material and method for rapid heating and shaping of sheet material.

BACKGROUND OF THE INVENTION

Superplastic forming (SPF) and quick plastic forming (QPF) methods of shaping sheet materials require high temperature environments to enable the characteristic extraordinary deformation of the sheet material. This high temperature environment is often provided by heated platens of a hydraulic press that subsequently heat sheet forming dies or by using embedded heaters to heat the dies directly. Successful implementation of SPF or QPF only requires that the sheet material is heated to a required temperature to enable the extraordinary deformations.

Induction heating is a technique to heat metal objects. However this technique works best with bulky work pieces such as cam shafts, gears and crank shafts. Heating thin sheet metal with induction techniques is very difficult because the sheet does not have structural rigidity. Deformation of the sheet under electromagnetic forces gets more severe as the temperature rises. As the sheet deforms and moves away from the induction coil, the heating effect becomes de-coupled, which can lead to very localized heating and melting. Induction techniques are able to focus the heating effect but are not as well suited for distributing heat, especially in a work piece with a large surface area to volume ratio.

SUMMARY OF THE INVENTION

The present invention relates to a heating and forming apparatus for sheet material and method for rapid heating and shaping of sheet material. In one aspect of the invention, a heating and forming apparatus for sheet material is provided. The apparatus comprises a first and second respectively movable forming dies, with the first forming die having a forming surface and defining a cavity with the second forming die. The forming surface of the first forming die is not heated. The apparatus is adaptable to receive a sheet material positionable within the cavity. A heating mechanism is placed within the cavity to heat the sheet material. A pressurization mechanism is in communication with the cavity for applying pressure to move the sheet material into conformity with the forming surface of the first forming die.

In another aspect of the invention, the forming surface of the first forming die may be heated to a low temperature, from about room temperature (21 degree C.) up to 300 degree C. The sheet material would continue to be heated with the heating mechanism. The sheet material needs to be about 450 degree C. for the conformations to take place.

In another aspect of the invention, one portion of the sheet material upon contacting the forming surface cools sufficiently to resist further conformation of that portion with the forming surface of the first forming die; and the heating mechanism continues heating other remaining portions of the sheet material not in contact with the forming surface, so that the other portions may continue to conform with the forming surface.

In another aspect of the invention, the heating mechanism comprises an induction coil assembly energizable within the cavity and positioned proximate to the sheet material. The induction coil assembly is suitable for conducting an alternating electrical current to create a fluctuating magnetic field for selectively inductively heating the sheet material within the magnetic field. The induction coil assembly is sufficiently translatable in at least two variable dimensions relative to the sheet material, so as to uniformly heat the sheet material at a sufficient temperature to continue the movement of the sheet material into conformity with the forming surface.

In another aspect of the invention, the heating mechanism comprises an induction coil assembly where the induction coil assembly is sufficiently horizontally movable relative to the sheet material, so as to uniformly heat the sheet material. The induction coil assembly is also sufficiently vertically movable relative to the sheet material, so as to heat portions of the sheet material where needed and to maintain a sufficient temperature of the portions of the sheet material to conform to the forming surface. In other embodiments of the invention, sources of heat such as flame heating, infrared radiation or other suitable sources may be used.

In another aspect of the invention, the induction coil assembly comprises a polygonal block of non-conductive refractory material, defining planar and side surfaces; a first induction coil embedded in the planar surface in the polygonal block of non-conductive refractory material; and a second induction coil embedded on the side surfaces of the polygonal block of non-conductive refractory material.

In another aspect of the invention, the pressurization mechanism comprises a fluid pressurization port in communication with the cavity, for applying fluid pressure to the second side of the sheet material to move the sheet material into conformity with the forming surface of the first die.

In another aspect of the invention, a first and second removable sliding element in communication with the first and second respectively movable forming dies is provided. The first and second removable sliding elements are moveable out of the way to permit removal of formed sheet material within the cavity.

In another aspect of the invention, a method of heating and shaping sheet material is also provided. In another aspect of the invention, an improvement in the process of stretch forming a sheet material into a product by using quick plastic forming (QPF) or superplastic forming (SPF) is provided. The improvement comprises not heating the first and second respectively movable forming dies, heating selected portions of the sheet material to forming temperature in a relatively cold die forming environment provided by the first and second dies with a controllable heating mechanism within a chamber, at least partially defined between a profile forming surface of the first die and the second die; and providing a pressurization mechanism in communication with the chamber to stretch the sheet material into conformity with the profile forming surface of the first die when the selected portion of the sheet material is heated.

Application of this method during the processes of superplastic forming (SPF) and quick plastic forming (QPF) results in a saving of time, cost and improved dimensional stability. In quick plastic forming, heated presses are typically first employed, followed by heated tools, to maintain the appropriate temperature in the sheet during the forming process. This invention allows for just the sheet to be heated, employing a cold press and cold tooling. Forming a hot sheet material into a room-temperature die set would enable faster production rates, improved part quality, reduced dimensional variation and many additional advantages for fabricating complex panels.

In addition to quick plastic forming and superplastic forming, this invention may be used in fluid forming techniques such as sheet hydroforming, warm forming and others to enhance the formability of the work piece.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
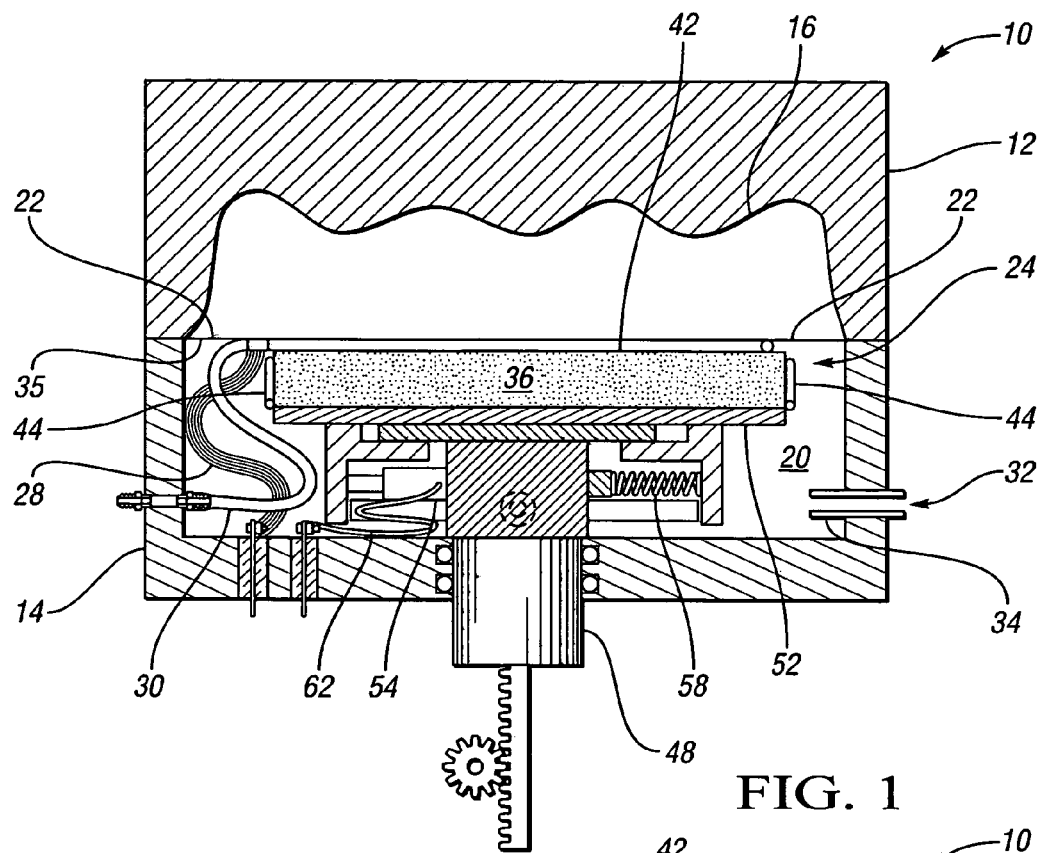
FIG. 1 is a schematic vertical cross sectional view of a heating and forming apparatus for rapid heating and shaping of sheet material.
Figure 2:
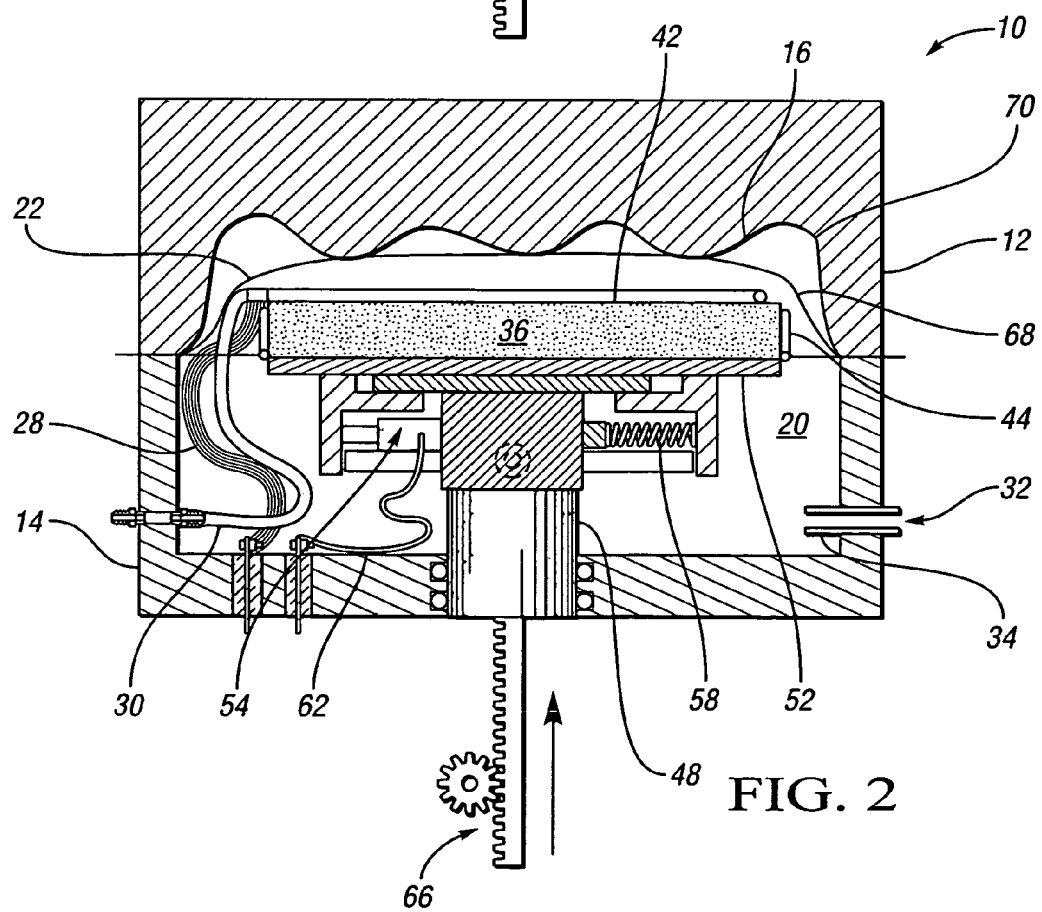
FIG. 2 is a schematic vertical cross sectional view of the heating and forming apparatus shown in FIG. 1, illustrating the vertical movement of the induction coil assembly as the sheet moves.

Referring to the drawings, FIGS. 1 and 2 are a schematic vertical cross sectional view of a heating and forming apparatus 10 for rapid heating and shaping of sheet material. In one embodiment of this invention, illustrated in FIGS. 1-4, the apparatus 10 would be placed inside a common hydraulic press (not shown), as in typical quick plastic forming (QPF) such as the later described U.S. Pat. No. 6,253,588. The apparatus 10 comprises first and second respectively movable forming dies 12 and 14. The first forming die 12 has a forming surface 16. The forming surface 16 and the second forming die 14 define a cavity 20. In the embodiment shown, the forming surface is not heated. A sheet material 22 is positioned within the cavity 20. The sheet material 22 may be aluminum or other suitable material. When placed in the cavity 20, the sheet material 22 may be locked between the first forming die 12 and second forming die 14 with seal beads (not shown), as in typical quick plastic forming.

A heating mechanism 24 is placed within the cavity 20 to heat the sheet material 22. The heating mechanism 24 comprises an induction coil assembly 26, illustrated in FIG. 3, placed proximate to the sheet material. The heating mechanism 24 further comprises a flexible electric lead 28 to electrically energize the induction coil assembly 26. Water-cooled flexible tubing 30 may also be used.

In an alternative embodiment of the invention, the forming surface 16 of the first forming die 12 could be slightly heated to a low temperature, with cartridge heaters as in normal QPF or with other suitable heating methods. The temperature of the forming surface 16 would be slightly elevated but still relatively low, from about room temperature (21 degree C.) up to 300 degree C. The sheet material 22 would continue be heated with the heating mechanism described above. The sheet material needs to be about 450 degree C. for the conformations to take place. Typically in QPF, the forming dies are heated and maintained at desired temperatures of about 440 degree C. to 452 degree C.

A pressurization mechanism 32 is in communication with the cavity 20 to move the sheet material 22 into conformity with the forming surface 16 of the first forming die 12. The pressurization mechanism 32 comprises a fluid pressurization port 34 within the cavity, for applying fluid pressure to the second side 35 of the sheet material 22, see FIG. 1, to move the sheet material 22 into conformity with the first die forming surface 16. In the embodiment shown, the fluid is gas. Other suitable methods of supplying pressure to assist the shaping of the sheet 22 may be used. The sheet material 22 is heated prior to the activation of the pressurization mechanism 32.

Figure 3:
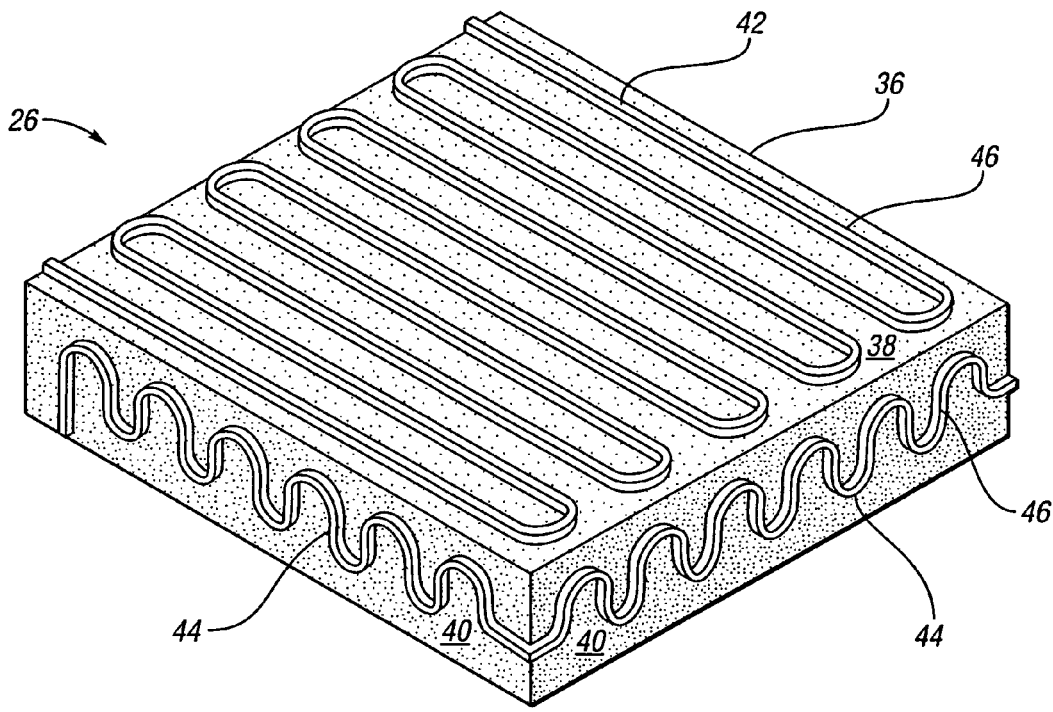
FIG. 3 is a schematic perspective view of an induction coil assembly, illustrating a polygonal block of non-conductive refractory material supporting an embedded first and second induction coils.

Referring to FIG. 3, a fragmentary schematic perspective view of an induction coil assembly 26 is shown. The induction coil assembly 26 shown in this embodiment comprises a polygonal block 36 of non-conductive refractory material, defining planar 38 and side surfaces 40; a first induction coil 42 embedded on the planar surface 38 in the polygonal block of non-conductive refractory material; and a second induction coil 44 embedded on the side surfaces 40 of the polygonal block 36 of non-conductive refractory material. The embodiment illustrated in FIG. 3 employs a pancake type coil 46. Other suitable coils may be employed in the induction coil assembly. The induction coil assembly is supported by a base 48 and resting surface 52.

The induction coil assembly 26 is suitable for conducting an alternating electrical current to create a fluctuating magnetic field for selectively inductively heating a sheet material 22 within the magnetic field. The fluctuating magnetic field induces current in the sheet material 22 when it is within the field. This induced current is concentrated near the sheet surface and resistively heats the surface. Because field strength is inversely proportional to distance from the inductor, it is desirable to position the sheet material 22 proximate to the induction coil assembly 26 to maximize the heating effect.

A beneficial side effect of the electromagnetic force generated by inductive heating is that it assists the gas pressure in shaping the sheet material. In other embodiments of the invention, sources of heat such as flame heating, infrared radiation or other suitable sources may be used.

The induction coil assembly 26 is sufficiently translatable in at least two variable dimensions relative to the sheet material 22, so as to uniformly heat the sheet material 22 at a sufficient temperature to continue the movement of the sheet material 22 into conformity with the forming surface 16 of the first forming die 12, see discussion below.

Horizontal Motion of Induction Coil Assembly

The induction coil assembly 26 is sufficiently horizontally movable relative to the sheet material 22, so as to uniformly heat the sheet material 22. For rapid heating with an induction coil assembly 26 containing pancake coils 46, there must be relative motion between the pancake coils 46 and the sheet material 22 in order to uniformly heat the sheet material 22 without locally melting it at any location. This relative motion distributes the concentration of eddy currents within the sheet material 22, which then dissipate as heat causing the sheet temperature 22 to rise.

Figure 4:
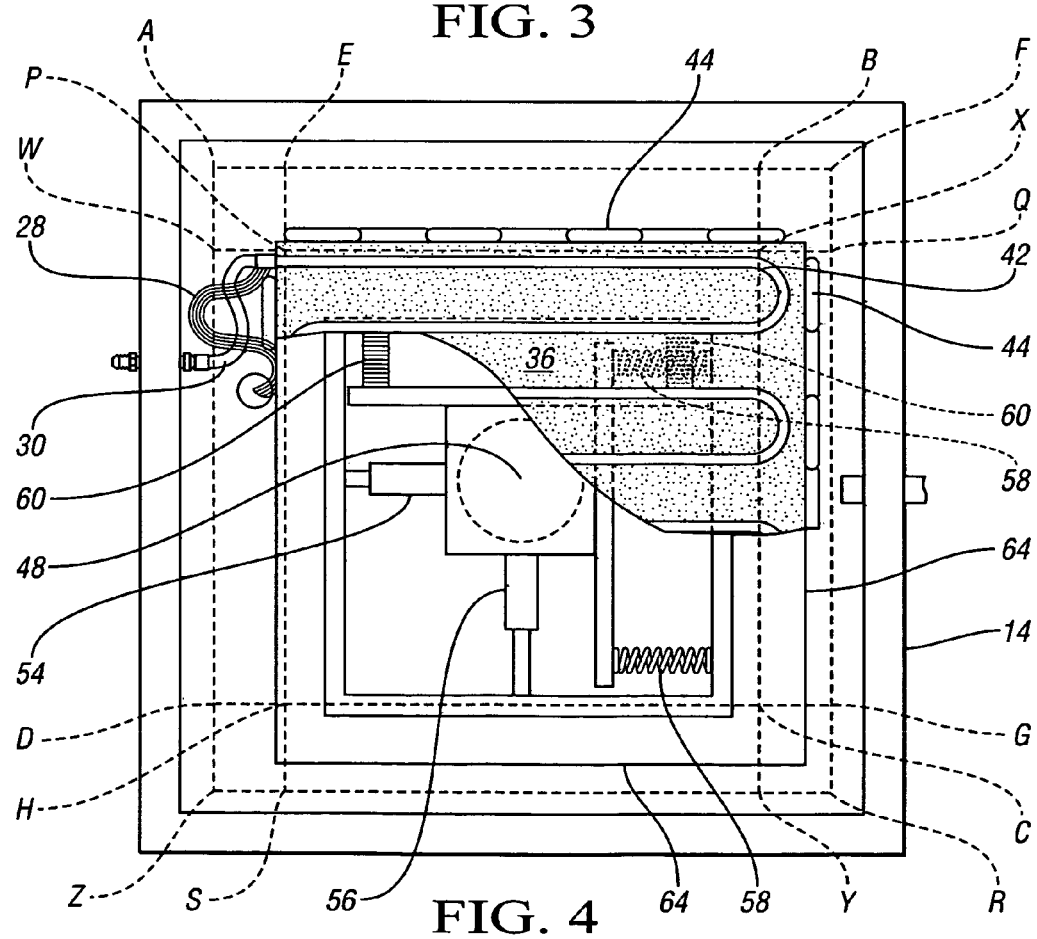
FIG. 4 is a schematic horizontal cross sectional view of the heating and forming apparatus shown in FIGS. 1 and 2.

FIG. 4 is a schematic horizontal cross sectional view of the heating and forming apparatus 10 illustrated in FIGS. 1 and 2. FIG. 4 shows the mechanism for the motion of the induction coil assembly 26 in the horizontal plane. The motion illustrated in FIG. 4 in the horizontal plane is a rectangular and orbital motion. In other embodiments of the invention, the relative motion could be circular, back-and-forth oscillation, or other simple motion that would promote uniform or tailored distributions of heat in the sheet material or portions of the sheet.

The heating rate can be very rapid depending on the sheet thickness, coil design, proximity between the coil and the sheet, and frequency of the power supply; higher frequency has less penetration depth which is necessary for thin sheet heating applications. The horizontal, rectangular, orbital path of the induction coil assembly shown in FIG. 4 is driven by a mechanism that moves the induction coil assembly 26 through two perpendicular driving cylinders 54 and 56. Each driving cylinder has at least one corresponding spring. As shown in FIG. 4, the driving cylinder 54 has corresponding springs 58, while driving cylinder 56 has corresponding springs 60, inside the second cavity. The driving cylinders 54 and 56 are powered through appropriate flexible connections 62. The driving cylinders 54 and 56 may be pneumatic, hydraulic or servo-powered. The driving cylinders 54 and 56 are actuated in sequence to produce the orbital path of the induction coil assembly 26. The starting position of the induction coil assembly 26 is shown by lead line 64. Rectangles ABCD, EFGH, WXYZ and PQRS represent the rectangular orbital path of the induction coil assembly 26.

Vertical Motion of Induction Coil Assembly

Referring to FIG. 2, as the sheet material 22 moves, the electromagnetic fields would tend to "un-couple", which would then limit the heating effect. Therefore, as the sheet material 22 moves, the induction coil assembly 26 must be translated vertically to maintain proximity to at least portions of the sheet material 22 for the heating effect.

As at least one portion of the sheet material 22 makes contact with the forming surface 16, see FIG. 2, it will cool sufficiently to resist further conformation of that portion with the forming surface 16 of the first forming die 12. The heating mechanism 24 continues heating other remaining portions of the sheet material 22 not in contact with the forming surface 16, so that the other portions may continue to conform with the forming surface 16.

The vertical movement of the induction coil assembly 26 is illustrated in FIG. 2. The induction coil assembly 26 is sufficiently vertically movable relative to the sheet material 22, to maintain proximity to portions of the sheet material 22 that continue to conform, so as to maintain the temperature of those portions of the sheet material 22. Proximity is maintained by the multi-dimensional translation motion of the induction coil assembly 26, at least until portions of the sheet material engage the forming surface 16 of the first forming die 12, see FIG. 2.

In the embodiment illustrated in FIG. 2, the vertical position of the induction coil assembly 26 is controlled by a vertical driving mechanism 66 attached to the base 48. The driving mechanism 66, in turn, is controlled either by a second action of the press or second action within the tooling i.e. hydraulic, pneumatic, servo motor or other suitable methods (not shown). Other suitable methods may also be used.

Tailored Heating

The induction coil assembly 26 may be designed to heat certain regions of the sheet material 22 that require more deformation than other portions, depending on product detail. This "tailored-heating" approach could be used to focus heating on the sidewalls and bottom corner regions of the product, as discussed below.

Tailored-heating could be performed with multiple induction coils that are turned on or off as needed. This could also be accomplished by designing a single induction coil into a shape that will preferentially heat specific areas of the sheet material. In the embodiment illustrated in FIG. 3, there are two sets of induction coils in the induction coil assembly 26, a first induction coil 42 and a second induction coil 44. The first induction coil 42 initially heats the sheet material 22 and may later be turned off as the sheet material 22 makes contact with the forming surface 16 of the first forming die 12. The second induction coil 44 continues to heat the side walls 68 of the sheet material and the areas that eventually fill in the bottom radius 70 of the first forming die 12. This may be the area that requires continued heating and extra deformation to fully form the product. The embodiment of the induction coil assembly 26 depicted in FIG. 3 would be suitable to form deep tub-shaped products such as door inner panels, STAR panels, or similar "deep-drawn" boxy shapes. To form products with more voluptuous shapes or with sharp features, the coil shape and movement of the coil, to distribute the heating effect as well as maintain proximity to the sheet material, would require more specific designs.

Specific coil designs could impart temperature gradients in the sheet material to control yield strength and elongation of certain regions resulting in "tailored strain" paths to improve thickness distributions of the final product, since warmer regions deform more than cooler regions that are stronger and more resistant to deformation. This could be significant in the forming of tailored-thickness sheet blanks. When tailor-welded sheet blanks of different thicknesses are deformed by quick plastic forming or superplastic forming under isothermal conditions, the thinner section of the sheet blank bulges dramatically while the thicker section strains much less. This leads to early rupture of the sheet blank. Tailored-heating with this invention could promote more uniform deformation of tailor-welded, multiple gage blanks.

Removable Sliding Elements

Figure 5:
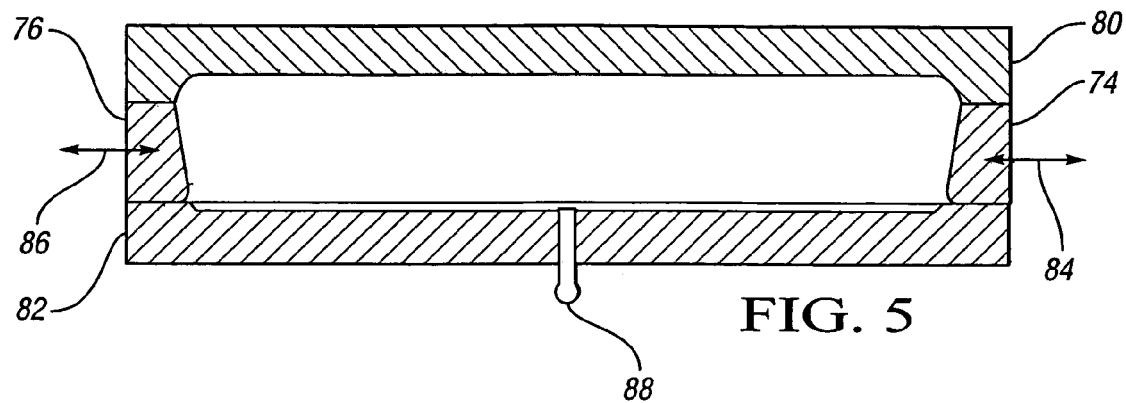
FIG. 5 is a fragmented schematic cross sectional view of a forming apparatus with a first and second removable sliding element.
Figure 6:
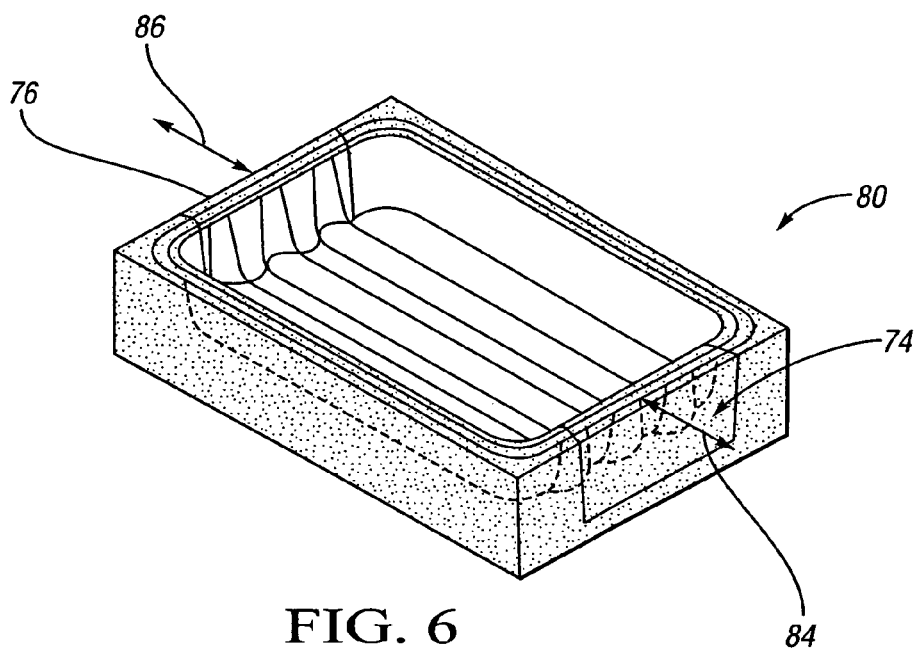
FIG. 6 is a schematic perspective view of a forming die with a first and second removable sliding element.
Figure 7:
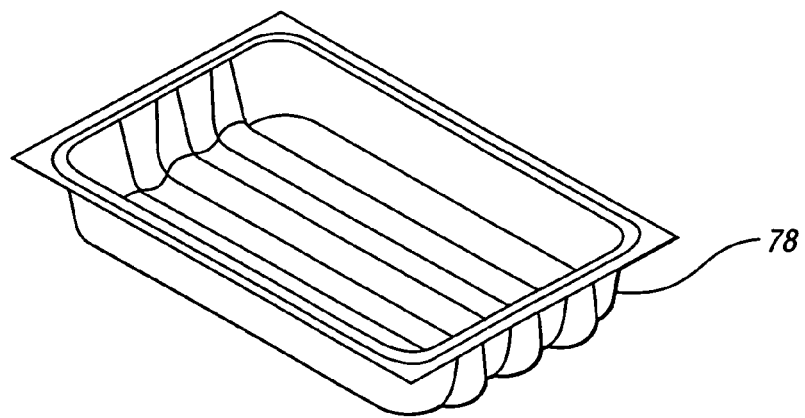
FIG. 7 is a schematic perspective view of a quick plastic formed product corresponding to the forming die shown in FIG. 6.

The flexibility of the tailored-heating approach with cold forming tools could enable more complex tooling options that were previously prohibited by the hot tool environment, such as removable sliding elements. Sliding elements generally do not work well at QPF temps because of friction and binding-up due to the lack of suitable lubricants. With removable sliding elements, QPF could be used to form very complex shapes, for example, shapes that would otherwise have "die-lock" conditions such as full "STAR" panels or door inners. FIGS. 5 and 6 illustrate a first removable sliding element 74 and a second removable sliding element 76 that are movable out of the way to permit removal of a complex shaped product 78, shown in FIG. 7. The removable sliding elements 74 and 76 are in communication with respectively movable first forming die 80 and second forming die 82. The first forming die 80 is shown in FIG. 6. The forming dies may be either non-heated or heated to a very low temperature, as discussed above. The complex-shaped QPF formed product 78 corresponding to the first forming die 80 is shown in FIG. 7. The arrows at 84 and 86 illustrate the direction of movement of the removable sliding elements 74 and 76, see FIGS. 5 and 6. A port 88 for supplying pressure is also shown in FIG. 5.

Such products as the full STAR panel might then have a "net-build" condition which is not favored from a build point of view which prefers a "slip line" to account for product variation. However, the hot forming of sheets into a cold tool should significantly reduce variation due to springback and could eliminate or reduce variation due to thermal contraction. Without variation in the product, a "net-build" condition may be acceptable.

Improvement in Fluid Forming Techniques

The present invention is an improvement of fluid forming techniques such as the quick plastic forming (QPF) process of fabricating sheet materials. In QPF typically, the forming dies are heated and maintained at desired temperatures of about 440 degree C. to 452 degree C. or 825 degree F. to 845 degree F. In the embodiment shown, only the sheet material is heated to the forming temperature and the sheet material is formed into a relatively cold die and press environment. This eliminates difficulties associated with substantially heated tools, and can open the window to explore many new ideas in tooling and processing that had previously been prohibited by the substantially hot tool environment. Incidental heating that does not affect the deformation properties of the sheet material is contemplated within the scope of the invention.

As discussed previously, in an alternative embodiment of the invention the forming dies could be slightly heated to a low temperature with cartridge heaters as in normal QPF or with other suitable heating methods. The temperature of the forming dies would be slightly elevated but still relatively low, from about room temperature (21 degree C.) up to 300 degree C. The sheet material 22 would continue to be heated with the heating mechanism described above. The sheet material needs to be about 450 degree C. for the deformations to take place.

In the present invention, induction heating techniques or other suitable heating sources may be used to rapidly heat sheet material to QPF temperatures within the QPF tooling. Gas pressure then forms the sheet material into the tool cavity as in normal QPF or superplastic forming (SPF). The electromagnetic force imposed on the sheet material through inductive heating works in cooperation with the gas pressure to form the product.

The invention may also be used in fluid forming techniques such as sheet hydroforming, warm forming and others to enhance the formability of the work piece.

Single Sheet Quick Plastic Forming (QPF)

Quick plastic forming (QPF) is described in U.S. Pat. No. 6,253,588, issued Jul. 3, 2001 to Rashid, et al and commonly assigned to General Motors, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$. Using. QPF, large AA5083-type aluminum-magnesium alloy sheet stock may be formed into a complex three-dimensional shape with high elongation regions, like a superplastic formed (SPF) (discussed below) part, at surprisingly higher production rates than those achieved by SPF practices.

In QPF typically, the forming tools are heated and maintained at desired temperatures of about 440 degree C. to 452 degree C.; the heated sheet is stretched against the forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming times are achieved for the parts described herein and their equivalents. This particular QPF process described in U.S. Pat. No. 6,523,588 may be referred to as "single sheet" QPF.

Superplastic Forming (SPF)

For low volume or niche applications, products may also be formed by superplastic forming (SPF), as described in U.S. Pat. No. 5,974,847, issued Nov. 2, 1999 to Saunders, et al and commonly assigned to General Motors, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. In addition to various steels and aluminum alloys, other structural materials such as zinc, brass, magnesium, titanium and their alloys have also been known to exhibit superplastic behavior.

While the best modes for carrying out the invention have been described in detail, those familiar with the art to which this invention relates will recognize various alternative designs and embodiments for practicing the invention within the scope of the appended claims.

The invention claimed is:

1. A heating and forming apparatus for sheet material, said apparatus comprising:
   first and second respectively movable forming dies;
   said first forming die having a forming surface and at least partially defining a cavity with said second forming die, said cavity being adapted to receive a sheet material therein;
   a heating mechanism within said cavity for heating said sheet material;
   a pressurization mechanism in communication with said cavity, for applying pressure to move said sheet material into conformity with said forming surface of said first forming die;
   an induction coil assembly energizable within said cavity and positioned proximate to said sheet material for selectively inductively heating said sheet material; and
   wherein said inductive heating of said sheet material assists said pressurization mechanism in forming said sheet material into conformity with said forming surface, through generation of electromagnetic force.

2. The apparatus of claim 1, wherein said forming surface of said first forming die is not heated.

3. The apparatus of claim 1, wherein said forming surface of said first forming die is heated to a low temperature, from about 21 degree C. up to 300 degree C.

4. The apparatus of claim 1,
wherein at least one portion of said sheet material upon contacting said forming surface cools sufficiently to resist further conformation of said at least one portion with said forming surface of said first forming die; and
wherein said heating mechanism continues heating other portions of said sheet material not in contact with said forming surface, so that said other portions may continue to conform with said forming surface.

5. The apparatus of claim 1, wherein said pressurization mechanism comprises:
a fluid pressurization port in communication with said cavity, for applying fluid pressure to the second side of said sheet material to move said sheet material into conformity with said forming surface of said first die.

6. The apparatus of claim 5, wherein said fluid is gas.

7. The apparatus of claim 1, wherein said sheet material is metallic.

8. The apparatus of claim 7, wherein said sheet material is aluminum.

9. A heating and forming apparatus for sheet material, the apparatus comprising:
first and second respectively movable forming dies;
said first forming die having a forming surface and at least partially defining a cavity with said second forming die, said cavity being adapted to receive a sheet material therein;
a heating mechanism within said cavity for heating said sheet material;
a pressurization mechanism in communication with said cavity, for applying pressure to move said sheet material into conformity with said forming surface of said first forming die;
an induction coil assembly energizable within said cavity and positioned proximate to said sheet material;
wherein said induction coil assembly is suitable for conducting an alternating electrical current to create a fluctuating magnetic field for selectively inductively heating said sheet material within said magnetic field; and
wherein said induction coil assembly is sufficiently translatable in at least two variable dimensions relative to said sheet material, so as to uniformly heat said sheet material at a sufficient temperature to continue the movement of said sheet material into said conformity with said forming surface.

10. The apparatus of claim 9:
wherein said induction coil assembly is sufficiently horizontally movable relative to said sheet material, so as to permit said uniform heating of said sheet material; and
wherein said induction coil assembly is sufficiently vertically movable relative to said sheet material, so as to heat portions of said sheet material where needed.

11. The apparatus of claim 9, wherein said induction coil assembly comprises:
a polygonal block of non-conductive refractory material, defining planar and side surfaces;
a first induction coil embedded on said planar surface in said polygonal block of non-conductive refractory material; and
a second induction coil embedded on said side surfaces of said polygonal block of non-conductive refractory material.

12. A heating and forming apparatus for sheet material, the apparatus comprising:
first and second respectively movable forming dies;
said first forming die having a forming surface and at least partially defining a cavity with said second forming die, said cavity being adapted to receive a sheet material therein;
a heating mechanism within said cavity for heating said sheet material; and
a pressurization mechanism in communication with said cavity, for applying pressure to move said sheet material into conformity with said forming surface of said first forming die;
a first removable sliding element in communication with said first and second respectively movable forming dies; and
a second removable sliding element in communication with said first and second respectively movable forming dies, wherein said first removable sliding element and said second removable sliding element are moveable out of the way to permit removal of formed sheet material within said cavity.

* * * * *